Patented Dec. 30, 1930

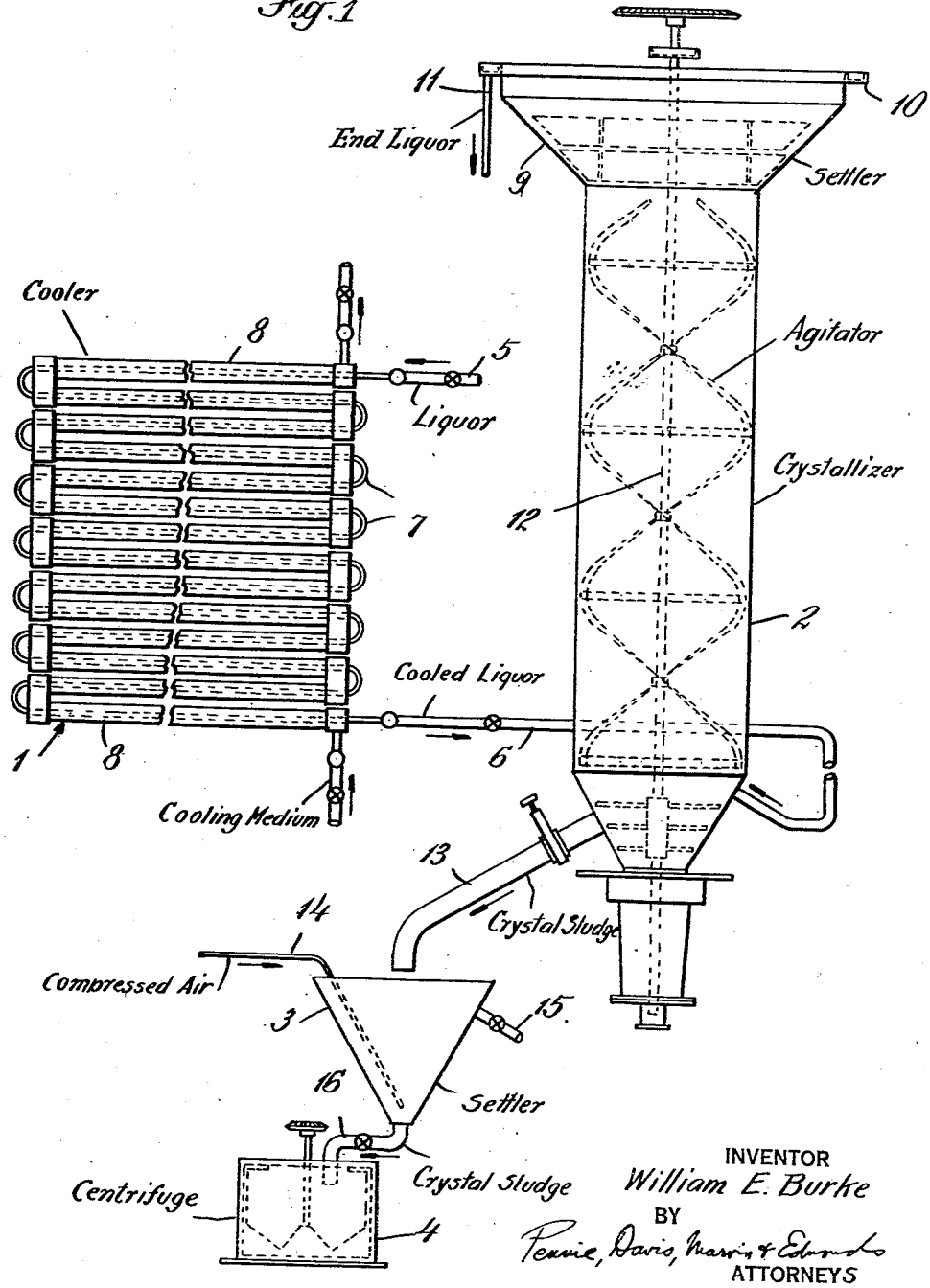

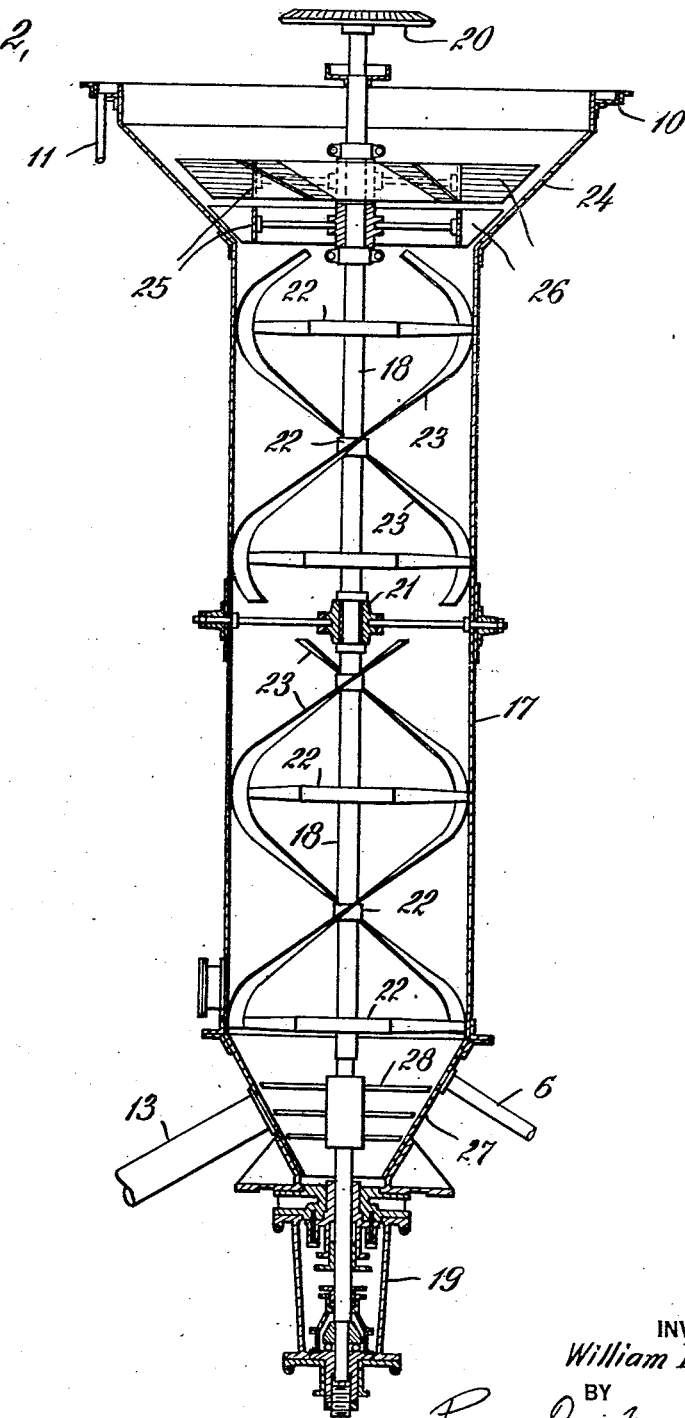

1,787,356

UNITED STATES PATENT OFFICE

WILLIAM E. BURKE, OF TRONA, CALIFORNIA, ASSIGNOR TO AMERICAN POTASH & CHEMICAL CORPORATION, OF NEW YORK, N. Y., A CORPORATION OF DELAWARE

CRYSTALLIZATION PROCESS

Application filed May 23, 1927. Serial No. 193,673.

This invention relates to improvements in methods and apparatus for crystallizing dissolved crystallizable constituents from liquors in which they are dissolved, for example, for crystallizing inorganic salts from salt solutions. In one aspect, the present invention relates particularly to the crystallization of borax from solutions saturated or supersaturated with potassium chloride and borax, such as are produced by the concentration of Searles Lake brine, and the present invention will be described more particularly in connection therewith. In a broader aspect, however, the invention includes improvements that are of more general application and that are useful and have advantages in other applications as will appear.

One method commonly employed for crystallizing salts from solutions thereof is to cool the solution, after bringing it to saturation or near saturation by evaporation of the solvent, and to precipitate the salt crystals because of reduced solubility at lower temperature. Ordinarily such operations are carried out in apparatus called "crystallizers" in which both the cooling and the crystallizing are effected, and the operation is usually carried out on a batch basis, a batch of hot solution being supplied to the crystallizer and cooled therein, the crystallized product and remaining solution removed and another batch of hot liquor supplied. Where the solution is cooled in the crystallizer, the cooling surfaces are rapidly covered with salt deposits which impede heat transfer and which soon render the cooling ineffective unless they are removed. Agitation is sometimes employed to retard this effect, but there are certain difficulties incident to the means of agitation which have previously been proposed for this purpose. Where the agitation is effected by the introduction of compressed air, the air tends to form channels through the crystal sludge as crystallization takes place so that the agitation is neither uniform nor adequate, and is at the same time difficult to control. Where mechanical agitation is employed, one serious difficulty is the tendency to "freezing up" of the agitator due to clogging of the agitator by the crystallized salt, particularly on starting up after a shut down. Agitation by the introduction of liquid is difficult to control and is not adapted for the production of a uniform product as ordinarily applied. Commercially, it is frequently necessary that the product be in crystals of uniform size. Also, for many commercial purposes, large crystals are desired, and agitation as usually applied tends to produce small crystals. Hitherto large crystals have been obtained by slow cooling of the solution, but for the treatment of large volumes of solutions this requires either crystallizers which are too large or too many small crystallizers. With batch operations, moreover, there is a loss of cooling and crystallizing time in charging and discharging, and cleaning, the crystallizers. Normally, when a solution saturated with more that one salt is cooled, the salts are crystallized and precipitated together. Certain salts, however, tend to stay in supersaturated solution and in such cases a separation or a partial separation of one or more of the salts can be effected before the crystallization of the other or others begins. However, the solution remains saturated with the separated salt and in further treatment to recover the salt remaining in the supersaturated solution this salt is usually obtained contaminated with the salt first removed. This entails further washing and refining operations, as well as incidental operations such as the rerunning of washing liquors. The brines obtained on concentration of Searles Lake brine are of complex character, and the separation of their various constituents, particularly borax and potassium chloride, has been further complicated by factors such as those outlined above. Hitherto, it has been necessary in ordinary operations to refine or recrystallize one or more of the products as initially separated to produce products meeting commercial requirements. This has been true of borax, for example, which as initially prepared from such brines is usually contaminated with potassium chloride and is frequently in the form of small and non-uniform crystals.

According to the present invention, the crystallization is carried out by cooling the solution to a temperature below saturation so that it is supersaturated with the salt, or other material, it is desired to crystallize and then flowing the supersaturated solution through a sludge or suspension of crystals of the salt or material while maintaining controlled agitation both mechanically and by liquor introduction. The operation is advantageously carried out in a continuous manner supplying supersaturated solution and withdrawing decrystallized solution and the crystal sludge or suspension in a progressive way. The cooling operation is carried out separately from the crystallizing operation. Difficulties due to crystal deposits on cooling surfaces in the crystallizer are thus avoided and the operation of the crystallizer is improved. The cooling operation also is carried out so that a minimum of crystallization is effected therein so that difficulties due to "salting-up" in the cooler are also reduced. The cooling is advantageously carried out as rapidly as possible to prevent or inhibit the formation of fine crystals or any large amount of crystals in the cooling operation, and in the cooling operation the temperature is advantageously reduced as far as possible below saturation, without undue crystallization, so that the cooled liquor supplied to the crystallizer is supersaturated to a maximum extent. When the supersaturated solution is brought into contact with the crystal sludge, crystallization takes place largely as a crystal growth on the crystals in the sludge so that large crystals can be obtained. The large exposed surface of the crystals in the sludge also promotes rapid crystallization and enables the crystallization to be carried out at an increased rate. The crystal sludge is advantageously maintained in a vertically arranged body to the lower end of which supersaturated solution is supplied, decrystallized solution being withdrawn from the upper end, and from the lower end of which the accumulating crystal sludge is removed either continuously or intermittently. In carrying out the present invention, the crystal sludge or suspension is agitated both mechanically and by the introduction of the supersaturated liquor in an improved manner serving to maintain the crystals in suspension. With the sludge or suspension in a vertical body, the crystals are progressively greater in size through the height of the body, smaller crystals being suspended nearer the top and larger crystals nearer the bottom, and this graduation of crystal size can be controlled by means of the agitation. The suspension and grading of the crystals can be effected under certain conditions by agitation due to liquor introduction and flow through the body alone, but usually the rates of flow required are so high as to require an excessive height of sludge body to complete the crystallization. With both mechanical and liquor agitation, the crystallization is promoted by carrying out the operation in a body relatively high or deep as compared to its cross-section. The larger crystals thus settle to the lower end of the body whence they can be withdrawn, and it will also be apparent that the invention enables the production of crystals very uniform as to size. The smaller crystals form or separate in the upper end of the body where they also tend to grow and to settle through the body replacing the seed crystals in the sludge as the crystal product is withdrawn. With rapid cooling of the liquor supplied to the crystallizing operation, the formation of small crystals is avoided or reduced and any tendency for the decrystallized liquor to carry off very fine crystals in suspension is correspondingly reduced, but it is advantageous to carry out a settling operation in connection with the crystallizing operation and to return to the crystallizing operation very fine crystals removed from the end liquor therein. For example, less vigorous agitation may be employed at the upper end of the liquid body in the crystallizer or the upper end of the body may be of enlarged cross section providing for separation and direct return to the crystallizing operation of very fine crystals. By effecting the crystallization from supersaturated solution upon seed crystals, in accordance with this invention, an improved separation between two or more crystallizable constituents can be obtained as the crystals grown on the seed crystals tend to be substantially of the composition of the seed crystals, and the invention is thus useful in effecting such separation even where the solution is supersaturated with more than one crystallizable constituent. The crystallizing operation can be further controlled by regulated dilution of the liquor, either before it is cooled or as it is supplied to the cystallizer, with solvent or with other appropriate solutions. For example, solvent alone may be supplied to reduce the degree of supersaturation particularly where the solution contains two or more crystallizable constituents; or, where the solution is saturated or supersaturated with one salt and supersaturated with another, it may be diluted with a solution which does not contain or which is not saturated with the first salt and which is saturated or supersaturated with the second to promote separation of the second salt.

In some cases it is advantageous to carry out the operation with repeated cooling and successive crystallization of the liquor. In one way of carrying out such an operation, the liquor is cooled to below saturation and then sent through one crystallizing operation, the decrystallized liquor from this crystallization is then again cooled to below saturation and sent through another crystallizing operation, and so on. In another way of carrying out such an operation, the decrystallized liquor from the crystallizing operation, or part of it, may be further cooled and again sent through the same crystallizing operation. Such methods are useful with solutions of salts which crystallize relatively rapidly or with solutions which cannot be cooled much below saturation, or wherever it may be undesirable to cool the solution too far or to too high a degree of supersaturation in a single step.

Searles Lake brine is of complex composition and consists essentially of sulphates, chlorides, carbonates and borates of sodium and potassium. This brine and similar brines can be concentrated to saturation or nearly to saturation with potassium chloride by evaporation at high temperature. In a prior application filed February 6, 1924, Serial No. 690,946, there is described an improved method of concentrating Searles Lake brine by evaporation at progressively higher temperatures, increasing the temperature progressively before the formation of glaserite begins at the prevailing temperature and concentration, in which the brine can be concentrated to saturation with potassium chloride without loss of potash or glaserite. For example, the brine may be evaporated in a triple effect evaporator successively at temperatures of about 57° C., 80° C., and finally 110° C. If such a concentrated brine is cooled slowly, potassium chloride and borax crystallize together. However, with rapid cooling, potassium chloride can be crystallized from the brine in a state of high purity and removed before the borax begins to crystallize. When a salt solution is treated in such a manner that the saturation concentration of the salt is over-stepped to any marked extent, when crystallization does begin it proceeds rapidly and the crystals are small, and this is the case in subsequent crystallization of borax from such brines after separation of potassium chloride. The rapid crystallization is also more or less irregular and difficult to control with the result that the crystals are not always uniform. For commercial purposes, it is desirable to have the borax in fairly large crystals of a uniform size. The degree of supersaturation of the brine with respect to borax after separation of potassium chloride can be reduced by heating the brine but this is not efficient. Moreover, after separation of the potassium chloride, the brine is saturated with respect to potassium chloride as well as supersaturated with respect to borax, and if further cooling is employed the borax is contaminated with potassium chloride. This is undesirable as a loss of potash as well as contamination of the borax, and for this reason it has been necessary to wash the crystallized borax and then to rerun the wash liquor to recover the dissolved potassium chloride. Refining and recrystallization of the borax has thus ordinarily been necessary, both to obtain it in a purified state and in crystals of large and uniform size. Very fine crystals also tend to be carried along in suspension in the end liquor constituting a loss of borax as well as complicating further treatment of the liquor. The present invention provides particularly an improved method of separating borax from such brines, and particularly concentrated brines produced by evaporation of Searles Lake brine, which avoids or reduces such difficulties and which enables the direct crystallization of borax from such concentrated brines in large crystals of uniform size substantially free from potassium chloride, or other contaminating salts such as glaserite.

In the treatment of Searles Lake brine, the brine is advantageously concentrated at high final temperature to saturation with potassium chloride and potassium chloride is crystallized out by rapid cooling and separated before the crystallization of borax begins. According to the present invention, the brine is then further cooled after the separation of crystallized potassium chloride, and after cooling the brine is flowed through a sludge of borax crystals. The cooling is carried out rapidly and to a point well below saturation with borax. After separation of the potassium chloride and further cooling, the brine is either saturated or beyond with potassium chloride as well as supersaturated with borax. In order to obtain a potassium chloride free borax, the brine supplied to the crystallizing operation may be diluted with water, or more advantageously with raw Searles Lake brine which is saturated with borax but not saturated with potassium chloride. One advantage of employing raw brine for dilution is that borax which would be dissolved in a diluent not saturated with borax is saved. The sludge of borax crystals is advantageously maintained in a body through which the supersaturated brine is flowed upwardly. The brine fresh from the cooling operation is supplied to the lower end of the body and the end liquor after crystallization of borax therefrom is removed from the upper end of the body. Agitation is maintained in part mechanically and in part by the flow of brine upwardly through the body. As the crystals grow the heavier and larger crystals settle toward the lower end of the body whence they are removed at a convenient point. By employing rapid cooling in conjunction with crystallization of borax from the supersaturated brine, the formation of fine crystals which tend to be carried over with the end liquor is inhibited. The end liquor may also with advantage be subjected to a settling operation from which settled crystals are returned to the crystallizing operation. The size of the borax crystals can be controlled by regulation of the agitation and by adjustment of the point at which the crystallized product is removed. The controlled agitation, in conjunction with crystallization of the borax by growth upon the seed crystals of borax in the sludge, also promotes uniformity of crystal size in the product. The borax may thus be crystallized from the brine in large, uniform and pure crystals. A borax product suitable for many commercial purposes may thus be produced directly. The rerunning or further evaporation of wash liquors employed for separation of potassium chloride from the borax, and this load upon the operation, may thus also be avoided, as well as the washing operations themselves.

The apparatus for carrying out the invention comprises a cooler and a separate crystallizer. The cooler may be of any of the usual types which are adapted to cool the liquor rapidly, for example double tube coolers may be employed, and for continuous operation it is advantageous to provide two or more coolers in conjunction with each crystallizer so that the operation can be carried on while one or more of the coolers is being cleaned. The invention includes an improved crystallizer of special value for carrying out the process of the invention. The crystallizer of the invention comprises a drum or cylinder with an approximately vertical axis provided with a mechanical agitator. The cylinder is advantageously relatively long with reference to its diameter. The agitator may consist of a series of arms arranged at intervals on a shaft extending through the cylinder and adapted to agitate liquor in the cylinder without giving it any substantial component of vertical motion. Scrapers may also be provided as part of the agitator to remove from the walls of the cylinder any salts crystallizing thereon. An outlet is arranged for removing crystal sludge from the lower end of the crystallizer and the agitators may also be provided with means for stirring up the sludge settling in the lower end of the crystallizer to promote its ready discharge and to inhibit any tendency toward freezing up of the agitator. One or more liquor inlets may be arranged either immediately above the crystal sludge outlet or at some intermediate point along the cylinder. One factor in determining the number of liquor inlets is the volume of liquor to be supplied as related to the tendency of constituents dissolved in the liquor to crystallize from it under the conditions of operation maintained. The number and area of liquor inlets are advantageously proportioned so that the rate of flow of liquor through them retards or prevents any clogging at this point due to crystal formation. The agitation of the contents of the cylinder effected by the mechanical agitator is further assisted by the flow of introduced liquor upwardly therethrough, and this effect may be increased by discharging the liquor into the cylinder tangentially.

Another way to introduce the liquor is through the agitator shaft and openings arranged thereon or openings arranged on arms on the agitator shaft and rotated therewith. For the separation of fine crystals from the end liquor and for their return to the cystallizer proper, a settler is advantageously arranged at the upper end of the crystallizing cylinder. This settler may be of increased area to retard the rate of liquor flow therethrough and the settler construction is advantageously such that its sides slope steeply to the upper end of the cylinder. It is also advantageous to provide means for propelling liquor and any settled crystals adjacent the sides of the settler toward the crystallizing cylinder, and such means may be carried by and operated with the agitator shaft. A trough or launder may be provided for the removal of liquor from the end of the settler. The invention includes, as apparatus, the improved crystallizer as well as the combination of the crystallizer with a separate cooler. The apparatus of the invention has several advantages, for example, it is compact and adapted to continuous operation, and has a high capacity.

The invention will be further described in connection with the accompanying drawings which illustrate in a diagrammatic and conventional manner apparatus embodying the invention and adapted for carrying out the invention. It is intended and will be understood, however, that this illustration and the further more detailed description are for the purpose of exemplification and that the invention is not limited thereto.

In the accompanying drawings:

Fig. 1 diagrammatically represents in elevation a cooler and crystallizer embodying the invention, and, somewhat in the way of a flow sheet, one way of carrying out the process of the invention, and Fig. 2 represents in vertical section and in somewhat more detail an improved crystallizer embodying the invention and adapted for use in practicing the invention.

With reference to Fig. 1, the apparatus there illustrated comprises a cooler 1, a crystallizer 2, a settler 3, and a centrifuge 4. In operation, liquor is supplied to the cooler through connection 5 and is discharged from the cooler and introduced into the lower end of the crystallizer through connection 6. The cooler illustrated is of the double tube type, the liquor being circulated through the inner tubes 7 and a suitable cooling medium, such as refrigerated brine, being circulated through the outer tubes 8. A sludge of crystals of the constituents of the liquor to be crystallized is maintained in the crystallizer, and the cooler liquor, supersaturated with this constituent, introduced into the lower end of the crystallizer through connection 6, is flowed upwardly through this sludge, and the end liquor is removed from the settler 9 arranged on the upper end of the crystallizer through the launder 10 and the connection 11. The crystal sludge in the crystallizer is agitated both by a mechanical agitator 12 and by the upward flow of liquor through the crystallizer. The crystals are thus maintained more or less in suspension in the liquor in the crystallizer, but, as the crystals grow in contact with the supersaturated liquor, the larger crystals settle toward the bottom of the crystallizer whence they are removed as they accumulate through connection 13. The connection 13 discharges into a cone settler 3 in which a rough separation of liquid from the crystallized material is effected, a compressed air inlet 14 being arranged for agitating the contents of the cone settler and a liquid draw-off connection being provided at 15. From the settler, the crystallized material is discharged through connection 16 into the centrifuge 4 for drying the crystalline product. The cooler, the cone settler, and the centrifuge may be of any usual suitable construction and operation. The crystallizer, and combined settler for the separation of fine crystals from the end liquor, is illustrated more in detail in Fig. 2.

Referring to Fig. 2, the crystallizer comprises a vertically arranged cylindrical shell 17 through which an axial shaft 18 extends. This shaft is supported at its lower end on a thrust bearing which is protected with suitable stuffing boxes as shown at 19. This shaft is driven from its upper end by suitable gearing as shown at 20 and an intermediate guide bearing is provided at 21. Arranged on the shaft 18 at several points throughout the length of the shell 17 are agitating arms 22. Scrapers 23, carried by the ends of the arms 22, are also provided for removing any material crystallizing on the interior of the shell 17. A settling chamber 24 of generally conical section is arranged at the upper end of the shell 17, and a launder 10 is arranged about the upper end of this settling chamber for the separation and removal of end liquor, the launder discharging through pipe 11. A pair of agitator wheels 25 are arranged on the shaft 18 within the settling chamber and vanes 26 are provided on these wheels arranged between the outside of the wheels and the walls of the settling chamber. These vanes are inclined to give a downward component of motion to the liquor, and any suspended or precipitated material, between the wheels and the walls of the settling chamber when the agitator is in operation. The lower end of the shell 17 is closed by a cone shaped member 27 in which the larger crystals tend to accumulate when the crystallizer is in operation. A stirrer comprising a number of rods 28 is arranged on and operated by the shaft 18 within the chamber formed by this conical member for maintaining the crystalline sludge in condition such that it can be discharged continuously or intermittently, as desired, through the outlet 13. The liquor inlet connection 6 may also be arranged to discharge into this chamber as shown, or it may be arranged to discharge at some intermediate point along the shell 17.

In the treatment of Searles Lake brine, the raw brine may be concentrated approximately to saturation with potassium chloride by evaporation at a high final temperature as has previously been described. By rapid cooling of the brine, for example, from about 110° C. to about 30° C., in less than 3 hours, after bringing the brine to saturation with potassium chloride at the higher temperature, the potassium chloride present in excess of that soluble at the lower temperature may be crystallized and separated from the brine before the borax begins to crystallize. One particularly advantageous method and apparatus for carrying out this cooling operation for the removal of potassium chloride are described in an application filed September 14, 1925, Serial No. 56,121. After separation of the potassium chloride, the concentrated brine is then rapidly cooled, for example, to about 20° C. and, in the apparatus illustrated, is introduced into the lower end of the crystallizer through connection 6. A sludge or suspension of borax crystals is maintained in the crystallizer. Initially, this sludge is supplied to the crystallizer from some outside source, but in continued operation the sludge is replaced from the fresh brine as part of the operation as will appear. The cooled brine flows upwardly through this crystal sludge, the sludge being maintained in agitation both by the flow of brine through the crystallizer and by the mechanical agitator 12, which for example may be driven at a rate in the neighborhood of one revolution per minute. In contact with the sludge of borax crystals in the crystallizer, borax is crystallized from the cooled brine super-saturated with borax, the crystallization taking place largely as a growth upon the crystals in the sludge. As the borax crystals grow they settle toward the lower end of the crystallizer whence they are removed through connection 13 for drying. In the crystallizer, the crystals present and the growing crystals seek a level which corresponds approximately to their size so that the crystallizer acts to grade the crystals as to size yielding borax crystals of uniform size. As the brine flows upwardly through the crystallizer, its content of borax in excess of saturation gradually crystallizes so that the finer crystals in the upper end of the crystallizer tend to increase in size as well as the coarser crystals in the lower end of the crystallizer where the brine is first introduced. These growing finer crystals also settle gradually toward the lower end of the crystallizer so that a continuous supply of seed crystals of borax is maintained. Very fine crystals of borax are finally precipitated from the brine in the settler 24 whence they are returned to the upper end of the crystallizer where they also tend to grow and to settle through the crystallizer. The brine supersaturated with borax is thus flowed upwardly through and in countercurrent to a downwardly moving sludge or suspension of borax crystals. The end liquor substantially free from borax crystals overflows into the launder 10 and is withdrawn for such further treatment as may be desired.

The crystallization of borax from the brine may also be carried out in two or more steps instead of in a single operation. In such progressive crystallization, the brine discharged from the crystallizer through connection 11 may be further cooled and again flowed through a sludge of borax crystals. The second crystallization may be carried out in another crystallizing unit or the brine, or part of it, after further cooling may be recirculated through the same crystallizer. In a continuous operation, a part of the brine discharged from the crystallizer may be so further cooled and recirculated through the crystallizer in a continuous manner. In one method of operation described in application Serial No. 690,946, the brine from the evaporators remaining after separation of potassium chloride and borax is recirculated through the evaporators together with fresh raw brine, and the present invention may be employed with advantage in such a cyclic process. In such an operation, where the brine is further cooled and the crystallization of borax from the brine by contact with a sludge of borax crystals is repeated, a part of the brine from the crystallizer may be continuously circulated through a cooler and again supplied to the same crystallizer and the remainder of the brine from the crystallizer returned to the evaporators.

While the invention has been described particularly in connection with the crystallization of borax from brines produced by concentration of Searles Lake brine, it will be apparent that it is useful in other crystallizations, such as in the crystallization of other inorganic salts or of other crystallizable constituents or materials of brines or liquors or solutions in which water or other liquid may be the solvent.

It will thus be seen that the present invention provides an improved method and apparatus for crystallizing dissolved crystallizable constituents from liquors in which they are dissolved in which the liquor after being brought to supersaturation with the constituent it is desired to crystallize is circulated in countercurrent flow with a sludge of crystals of the same constituent. The sludge of crystals, according to the present invention, is moving as well as the supersaturated brine which is flowed therethrough, the crystals of the sludge growing by crystallization of the same constituent from the supersaturated brine and being removed from the operation as they reach the desired size. At the same time, the crystals forming the sludge moving countercurrent to the supersaturated brine are continuously supplied by crystallization from the brine so that the operation can be carried out in a continuous manner. The large surface area of the crystals in the sludge provides a large crystallization surface promoting rapid crystallization enabling the operation to be carried out rapidly and in compact and efficient apparatus. Also, by effecting the crystallization by contact between a supersaturated solution and crystals of the desired constituent, contamination of the crystalline product with other constituents is avoided or inhibited. It will also be apparent that the present invention provides an improved method and apparatus for the direct crystallization of crystallizable constituents from such liquors in large crystals, and in a continuous operation, avoiding cumbersome batch operations hitherto employed in the production of large crystals. It will also be apparent that the invention provides important advantages in enabling the production of crystals uniform as to size. It will further be seen that the invention provides an improved method and apparatus for crystallization in which the cooling of the liquor is carried out separately from the crystallization, or in which the crystallization is promoted or assisted by a cooling operation carried out separately from the crystallizing operation.

I claim:

1. The method of obtaining a commercially useful recovery of borax by crystallization from a borax liquor by a single passage of the liquor through a crystallizer which includes, cooling the liquor rapidly to a temperature sufficiently low that the liquor becomes highly supersaturated with borax, the supersaturation being sufficient so that when the liquor is brought into the presence of borax nuclei there will be a rapid formation of additional borax nuclei and agglomeration of such nuclei together into a multi-nuclei crystal, and passing such supersaturated liquor into contact with borax nuclei so as to effect the aforesaid production of additional nuclei and agglomeration of said nuclei together.

2. The method of obtaining a commercially useful recovery of borax by crystallization from a borax liquor by a single passage of the liquor through a crystallizer which includes, cooling the liquor rapidly to a temperature sufficiently low that the solution becomes highly supersaturated with borax, the supersaturation being sufficient so that when the liquor contacts with borax nuclei there is a rapid production of additional borax nuclei from the liquor and an agglomeration of said nuclei together into multi-nuclei crystals of borax, and passing such supersaturated liquor upwardly through a body of liquor in which crystals of borax are suspended, so as to effect the aforesaid production of additional nuclei and the agglomeration of the same together.

3. The method of obtaining a commercially useful recovery of borax by crystallization from a borax liquor by a single passage of the liquor through a crystallizer which includes, cooling the liquor rapidly to a temperature sufficiently low that the solution becomes highly supersaturated with borax, the supersaturation being sufficient so that when the liquor contacts with borax nuclei there is a rapid production of additional borax nuclei from the liquor and an agglomeration of said nuclei together into multi-nuclei crystals of borax, passing such supersaturated liquor upwardly through a body of liquor in which crystals of borax are suspended, so as to effect the aforesaid production of additional nuclei and the agglomeration of the same together, withdrawing a sludge of the agglomerate borax crystals, and continuously withdrawing from the upper end of the body of liquor the spent liquor.

4. The method of obtaining a commercially useful recovery of borax by crystallization from a borax liquor by a single passage of the liquor through a crystallizer in which the liquor is cooled rapidly to a temperature sufficiently low as to produce a high supersaturation of the liquor with respect to borax, then passing the liquor once through a body of liquor containing crystals of borax, the liquor travelling upwardly while the borax crystals descend, the saturation of the liquor with respect to borax being sufficient so that in said body of liquor there is a rapid production of borax nuclei which agglomerate together into multi-nuclei crystals of borax, and removing borax crystals from said body of liquor.

5. An improved method of crystallizing borax from liquor saturated with borax and potassium chloride, which comprises bringing the liquor to supersaturation with borax and flowing the supersaturated liquor countercurrent to a sludge of borax crystals through a crystallizer which is relatively high with reference to its diameter.

6. An improved method of crystallizing borax from liquor saturated with borax and potassium chloride, which comprises bringing the liquor to supersaturation with borax, maintaining in a crystallizer which is relatively high with reference to its diameter a liquid body in which borax crystals are suspended, supplying the liquor supersaturated with borax to the lower end of said body and flowing it upwardly therethrough, removing the liquor after crystallization of borax therefrom from the upper end of said body, and removing the crystallized borax from the lower end of said body as it accumulates.

7. An improved method of crystallizing borax from liquor saturated with borax and potassium chloride, which comprises bringing the liquor into supersaturation with borax and then passing the liquor through a crystallizer which is relatively high with respect to its diameter and which contains a sludge of borax crystals.

8. The method of obtaining a commercially useful recovery of borax by crystallization from a liquor saturated with borax and potassium chloride by a single passage of the liquor through a crystallizer, which comprises bringing the liquor to supersaturation with borax and flowing the saturated liquor through the crystallizer countercurrent to a sludge of borax crystals.

9. The method of obtaining a commercially useful recovery of borax by crystallization from a liquor saturated with borax and potassium chloride by a single passage of the liquor through a crystallizer, which comprises bringing the liquor to supersaturation with borax, maintaining in the crystallizer an upwardly moving current of liquid through a liquid body in which borax crystals are suspended, supplying the liquor supersaturated with borax to the lower end of said body, removing the liquor after crystallization of borax therefrom from the upper end of said body, and removing the crystallized borax from the lower end of said body as it accumulates.

10. The method of obtaining a commercially useful recovery of borax by crystallization from a liquor saturated with borax and potassium chloride by a single passage of the liquor through a crystallizer, which comprises bringing the liquor into supersaturation with borax and then bringing the liquor into contact with a sludge of borax crystals.

11. The method of obtaining a commercially useful recovery of borax by crystallization from a liquor saturated with borax and potassium chloride by a single passage of the liquor through a crystallizer, which comprises bringing the liquor into supersaturation with borax, maintaining a body of liquid in the crystallizer and flowing the supersaturated liquor upwardly therethrough, maintaining borax crystals in suspension in the liquid body by the combined action of mechanical agitation and the upwardly moving liquor, removing the liquor after crystallization of borax therefrom from the upper end of the body and removing the crystallized borax from the lower end of the body.

12. The method of obtaining a commercially useful recovery of borax by crystallization from a liquor saturated with borax and potassium chloride by a single passage of the liquor through a crystallizer, which comprises first cooling the liquor to supersaturation with borax and then bringing the cooled supersaturated liquor into contact with a sludge of borax crystals.

13. The method of obtaining a commercially useful recovery of borax by crystallization from a liquor saturated with borax and potassium chloride by a single passage of the liquor through a crystallizer, which comprises diluting the liquor, bringing the diluted liquor to supersaturation with borax and bringing the supersaturated liquor into contact with a sludge of borax crystals within the crystallizer.

14. The method of obtaining a commercially useful recovery of borax by crystallization from a liquor saturated with borax and potassium chloride by a single passage of the liquor through a crystalizer, which comprises diluting the liquor with a solution saturated with borax but not saturated with potassium chloride, bringing the diluted liquor to supersaturation with borax and bringing the supersaturated liquor into contact with a sludge of borax crystals within the crystallizer.

15. The method of obtaining a commercially useful recovery of borax by crystallization from a liquor saturated with borax and potassium chloride on each passage of the liquor through a crystallizer, which comprises bringing the liquor to supersaturation with borax and bringing the liquor supersaturated with borax into contact with a sludge of borax crystals within the crystallizer, and repeating the operation on the liquor after crystallization of borax therefrom after again bringing it to supersaturation with borax.

16. The method of obtaining a commercially useful recovery of borax by crystallization from a liquor saturated with borax and potassium chloride by a single passage of the liquor through a crystallizer, which comprises first bringing the liquor to supersaturation with borax and then bringing the liquor supersaturated with borax into contact with a sludge of borax crystals within the crystallizer in a separate operation in which substantially no heat is externally removed from the liquor.

17. The method of obtaining a commercially useful recovery of borax by crystallization from a liquor saturated with borax and potassium chloride by a single passage of the liquor through a crystallizer, which comprises bringing the liquor to supersaturation with borax, maintaining an upwardly moving current of liquid through a liquid body in the crystallizer in which borax crystals are suspended, continuously supplying the liquor supersaturated with borax to the lower end of said body, and continuously removing the liquor after crystallization of borax therefrom from the upper end of said body and removing the crystallized borax from the lower end of said body as it accumulates.

18. The method of obtaining a commercially useful recovery of borax by crystallization from a liquor saturated with borax and potassium chloride by a single passage of the liquor through a crystallizer, which comprises bringing the liquor to supersaturation with borax, flowing the supersaturated liquor upwardly through a body of liquid in the crystallizer in which crystals of borax are suspended, effecting a separation of suspended crystals of borax from the liquor at the upper end of the body, and returning the separated crystals to the body, removing the liquor after crystallization of borax therefrom from the last-mentioned operation, and removing the crystallized borax from the lower end of said body as it accumulates.

19. The method of obtaining a commercially useful recovery of borax by crystallization from a liquor saturated with borax and potassium chloride on each passage of the liquor through a crystallizer, which comprises bringing the liquor to supersaturation with borax and flowing the supersaturated liquor countercurrent to a sludge of crystals of borax in the crystallizer, again bringing the liquor after crystallization of borax therefrom to supersaturation with borax, and again flowing the supersaturated liquor countercurrent to a sludge of crystals of borax.

20. The method of obtaining a commercially useful recovery of borax by crystallization from liquor by a single passage of the liquor through a crystallizer, which comprises cooling the liquor rapidly to a temperature sufficiently low that the liquor becomes highly supersaturated with borax, the supersaturation being sufficient so that when the liquor is brought into the presence of borax nuclei there will be a rapid formation of additional borax nuclei and agglomeration of such nuclei together into multi-nuclei crystals, and passing such supersaturated liquor into contact with borax nuclei so as to effect the aforesaid production of additional nuclei and agglomeration of said nuclei together.

21. The method of obtaining a commercially useful recovery of borax by crystallization from liquor by a single passage of the liquor through a crystallizer, which comprises cooling the liquor rapidly to a temperature sufficiently low that the solution becomes highly supersaturated with borax, the supersaturation being sufficient so that when the liquor contacts with the borax nuclei there is a rapid production of additional borax nuclei from the liquor and an agglomeration of said nuclei together into multi-nuclei crystals of borax, and passing such supersaturated liquor upwardly through a body of liquor in which crystals of borax are suspended, so as to effect the aforesaid production of additional nuclei and the agglomeration of the same together.

22. The method of obtaining a commercially useful recovery of borax by crystallization from liquor by a single passage of the liquor through a crystallizer, which comprises cooling the liquor rapidly to a temperature sufficiently low that the solution becomes highly supersaturated with borax, the supersaturation being sufficient so that when the liquor contacts with borax nuclei there is a rapid production of additional borax nuclei from the liquor and an agglomeration of said nuclei together into multi-nuclei crystals of borax, passing such supersaturated liquor upwardly through a body of liquor in which crystals of borax are suspended, so as to effect the aforesaid production of additional nuclei and the agglomeration of the same together, withdrawing a sludge of the agglomerate borax crystals, and continuously withdrawing from the upper end of the body of liquor the spent liquor.

In testimony whereof I affix my signature.

WILLIAM E. BURKE.